United States Patent
Pak

(10) Patent No.: US 12,243,408 B2
(45) Date of Patent: Mar. 4, 2025

(54) LOST ARTICLE MANAGEMENT METHOD, DEVICE, AND SYSTEM IN VEHICLE

(71) Applicants: Hyundai Motor Company, Seoul (KR); Kia Corporation, Seoul (KR)

(72) Inventor: Nahyeon Pak, Gyeonggi-do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 360 days.

(21) Appl. No.: 17/742,120

(22) Filed: May 11, 2022

(65) Prior Publication Data

US 2023/0022999 A1     Jan. 26, 2023

(30) Foreign Application Priority Data

Jul. 26, 2021    (KR) .................. 10-2021-0097613

(51) Int. Cl.
*G08B 21/24*     (2006.01)
*G06V 10/764*    (2022.01)
*G06V 20/59*     (2022.01)

(52) U.S. Cl.
CPC .......... *G08B 21/24* (2013.01); *G06V 10/764* (2022.01); *G06V 20/59* (2022.01)

(58) Field of Classification Search
CPC ...... G08B 21/24; G06V 10/764; G06V 20/59; G06Q 50/10; B60R 11/04; B60W 40/08; B60W 2050/146; B60W 2420/403; G06N 3/08
See application file for complete search history.

(56) References Cited

U.S. PATENT DOCUMENTS

| | | | |
|---|---|---|---|
| 2003/0160706 A1* | 8/2003 | Endress | B64D 11/00155 340/945 |
| 2020/0128482 A1* | 4/2020 | Daoura | H04W 4/80 |

FOREIGN PATENT DOCUMENTS

| | | | |
|---|---|---|---|
| JP | 2012123491 A | * | 6/2012 |
| KR | 2021-0004556 A | | 1/2021 |
| KR | 2021-0012191 A | | 2/2021 |

* cited by examiner

*Primary Examiner* — Said M Elnoubi
(74) *Attorney, Agent, or Firm* — Fox Rothschild LLP

(57) ABSTRACT

A lost article management method in a vehicle includes: generating first detection information by detecting a passenger or an article by using a first camera or first sensor installed in the vehicle and separated by a first distance from a seated point of the passenger; generating second detection information by detecting the passenger or the article by using a second camera or second sensor installed in the vehicle and separated by a second distance from the seated point; generating third detection information by detecting a background excluding the passenger and the article; providing a lost status prediction model; determining whether an article has been lost from the first detection information to the third detection information; and displaying a lost article confirmation request on a plurality of display devices installed in the vehicle when it is determined that the article has been lost.

20 Claims, 17 Drawing Sheets

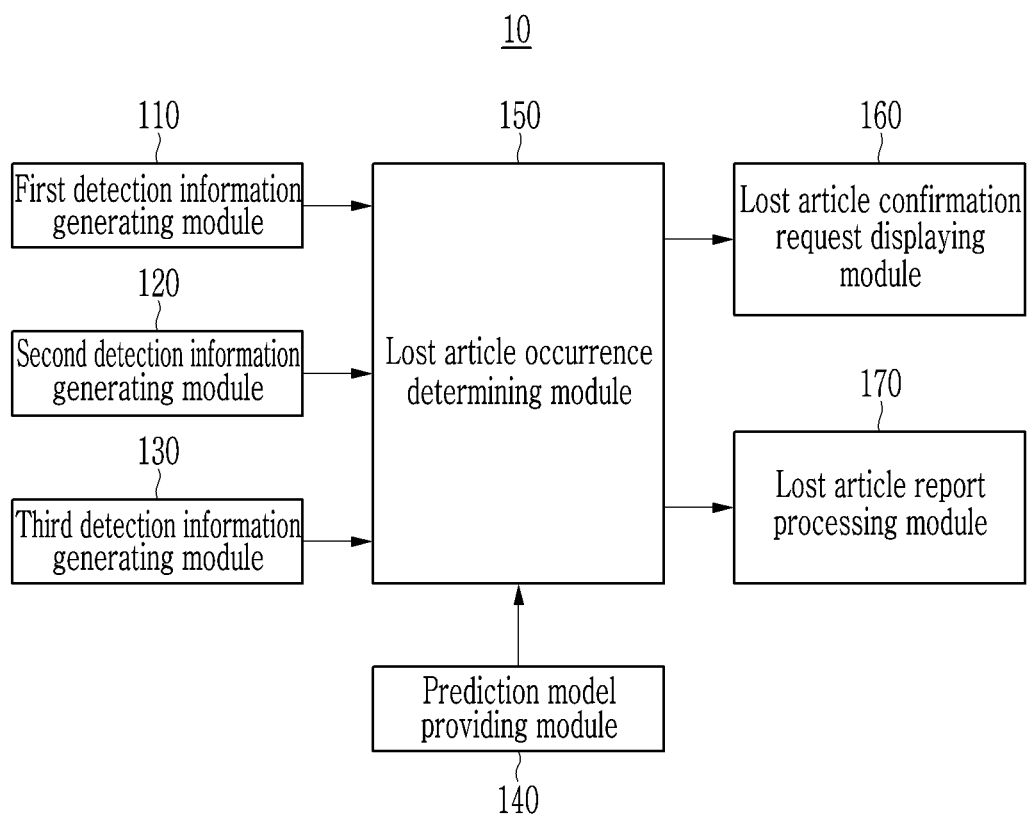

US 12,243,408 B2

LOST ARTICLE MANAGEMENT METHOD, DEVICE, AND SYSTEM IN VEHICLE

CROSS-REFERENCE TO RELATED APPLICATION

This application claims under 35 U.S.C. § 119 the benefit of Korean Patent Application No. 10-2021-0097613 filed in the Korean Intellectual Property Office on Jul. 26, 2021, the entire contents of which are incorporated herein by reference.

BACKGROUND

(a) Technical Field

The present disclosure relates to a lost article management method, device, and system in a vehicle.

(b) Description of the Related Art

Recently, companies that provide vehicle-sharing services or vehicle-calling services have been developing a vehicle-sharing market. In addition, in order to share a vehicle with multiple people, various technologies are being developed, including smartphone-based digital key technology to replace a physical key, autonomous driving technology, fingerprint recognition key technology to provide a service for a specific individual even in sharing with others, and personalization-related technology such as customized implementation of a vehicle's internal environment.

In addition to development of the vehicle-sharing market, research on technologies for predicting, preventing, or handling occurrence of a lost article by a passenger using a vehicle is also being performed. For example, when a passenger leaves his or her article in a vehicle, although it is possible to report a lost article by using information such as boarding vehicle number and driver contact information provided by a vehicle calling service (taxi calling service), since a passenger generally realizes he or she has lost an article after exiting the vehicle, there is a limit to such a lost and found handling method.

The above information disclosed in this Background section is only for enhancement of understanding of the background of the disclosure, and therefore it may contain information that does not form the prior art that is already known in this country to a person of ordinary skill in the art.

SUMMARY

The present disclosure provides a lost article management method, device, and system in a vehicle that may improve user convenience by recognizing a lost article in a vehicle and providing a passenger with a request for confirmation of the lost article and reporting of the lost article.

An embodiment of the present disclosure provides a lost article management method in a vehicle, including: generating first detection information by detecting a passenger or an article by using a first camera or first sensor that is installed in a vehicle to be separated by a first distance from a seated point of the passenger; generating second detection information by detecting the passenger or the article by using a second camera or second sensor that is installed in the vehicle to be separated by a second distance from the seated point, wherein the second distance is longer than the first distance; generating third detection information by detecting a background excluding the passenger and the article; providing a lost status prediction model generated through learning; determining whether an article has been lost from the first detection information to the third detection information by using the lost status prediction model; and providing a lost article confirmation request to the passenger when it is determined that the article has been lost.

The generating of the first detection information may include at least one of: detecting the passenger or the article by using the first camera or the first sensor before the passenger gets in the vehicle; detecting the passenger or the article by using the first camera or the first sensor at a predetermined time interval after the passenger gets in the vehicle; or detecting the passenger or the article by using the first camera or the first sensor at a predetermined time point before the passenger gets out of the vehicle.

The generating of the second detection information may include at least one of: detecting the passenger or the article by using the second camera or the second sensor before the passenger gets in the vehicle; detecting the passenger or the article by using the second camera or the second sensor at a predetermined time interval after the passenger gets in the vehicle; or detecting the passenger or the article by using the second camera or the second sensor at a predetermined time point before the passenger gets out of the vehicle.

The generating of the third detection information may further include classifying the background into an area in which the passenger is able to put the article down and a prohibited area in which the passenger is not able to put the article down.

The lost status prediction model may include a collection model; and the collection model may be learned to classify a case in which an article is dumped in a predetermined area and then is not collected for a predetermined time.

The lost status prediction model may include a dumping model; and the dumping model may be learned to classify an action of a person placing an article in a predetermined area.

The lost status prediction model may include a lost model; and the lost model may be learned to classify a case in which an article placed in a predetermined prohibited area is not collected.

The lost status prediction model may include a distance difference model; and the distance difference model may be learned to determine whether an article has been lost from a position difference between a vehicle and an article.

At least one of the generating of the first detection information, the generating of the second detection information, and the generating of the third detection information may be performed for an area defined by a first radius with respect to the seated point, and then may be performed again for an area defined by a second radius larger than the first radius.

The lost article management method in the vehicle may further include, when it is determined that the article has been lost, displaying the lost article confirmation request on a plurality of display devices installed in the vehicle; and providing a user interface for a lost article reporting process through the plurality of display devices installed in the vehicle.

Another embodiment of the present disclosure provides a lost article management device in a vehicle, including: a first detection information generating module that generates first detection information by detecting a passenger or an article by using a first camera or first sensor that is installed in a vehicle to be separated by a first distance from a seated point of the passenger; a second detection information generating module that generates second detection information by detecting the passenger or the article by using a second camera or second sensor that is installed in the vehicle to be separated by a second distance from the seated point, wherein the second distance is longer than the first distance; a third detection information generating module that generates third detection information by detecting a background excluding the passenger and the article; a prediction model providing module that provides a lost status prediction model generated through learning; a lost article occurrence determining module that determines whether an article has been lost from the first detection information to the third detection information by using the lost status prediction model; and a lost article confirmation request displaying module that provides a lost article confirmation request to the passenger when it is determined that the article has been lost.

The first detection information generating module may detect the passenger or the article by using the first camera or the first sensor before the passenger gets in the vehicle, may detect the passenger or the article by using the first camera or the first sensor at a predetermined time interval after the passenger gets in the vehicle, or may detect the passenger or the article by using the first camera or the first sensor at a predetermined time point before the passenger gets out of the vehicle.

The second detection information generating module may detect the passenger or the article by using the second camera or the second sensor before the passenger gets in the vehicle, may detect the passenger or the article by using the second camera or the second sensor at a predetermined time interval after the passenger gets in the vehicle, or may detect the passenger or the article by using the second camera or the second sensor at a predetermined time point before the passenger gets out of the vehicle.

The third detection information generating module may classify the background into an area in which the passenger is able to put the article down and a prohibited area in which the passenger is not able to put the article down.

The lost status prediction model may include a collection model; and the collection model may be learned to classify a case in which an article is dumped in a predetermined area and then is not collected for a predetermined time.

The lost status prediction model may include a dumping model; and the dumping model may be learned to classify an action of a person placing an article in a predetermined area.

The lost status prediction model may include a lost model; and the lost model may be learned to classify a case in which an article placed in a predetermined forbidden area is not collected.

The lost status prediction model may include a distance difference model; and the distance difference model may be learned to determine whether an article has been lost from a position difference between a vehicle and an article.

At least one of the first detection information generating module to the third detection information generating module may generate detection information for an area defined by a first radius with respect to the seated point, and then may re-generate detection information for an area defined by a second radius larger than the first radius.

The lost article confirmation request displaying module may display the lost article confirmation request on a plurality of display devices installed in the vehicle when it is determined that the article has been lost, and the lost article management device in the vehicle may further include a lost article report processing module that provides a user interface for a lost article reporting process through a plurality of display devices installed in the vehicle when it is determined that the article has been lost.

Another embodiment of the present provides a lost article management system in a vehicle, including: a first camera or a first sensor that is installed in a vehicle to be separated by a first distance from a seated point of a passenger; a second camera or a second sensor that is installed in the vehicle to be separated by a second distance from the seated point, wherein the second distance is longer than the first distance; a plurality of display devices installed in the vehicle; and an in-vehicle infotainment device installed in the vehicle and using a processor to execute instructions stored in a memory, wherein the instructions generate first detection information by detecting the passenger or the article by using the first camera or the first sensor, generate second detection information by detecting the passenger or the article by using the second camera or the second sensor, generate third detection information by detecting a background excluding the passenger and the article, and determine whether an article has been lost from the first detection information to the third detection information by using a lost status prediction model generated through learning, and when it is determined that the article has been lost, an instruction that executes an operation of displaying a lost article confirmation request on the plurality of display devices is included.

The instructions may provide a user interface for a lost article reporting process through the plurality of display devices when it is determined that the article has been lost, and may further include an instruction that executes a lost article report by transmitting lost article report content received through the user interface to a server.

According to the embodiments of the present disclosure, by using detection information generated by a plurality of detection information generating modules and various prediction models provided by a prediction model providing module, it is possible to quickly and accurately recognize a lost article in a vehicle by considering various situations such as a position of an article in the vehicle, a cause of placement of the article, and whether or not the article is collected. In addition, when it is determined that an article has been lost, it is possible to minimize occurrence of the lost article by immediately providing a request for confirmation of the lost article to a passenger, and to provide quick and convenient processing such as reporting of the lost article.

BRIEF DESCRIPTION OF THE DRAWINGS

FIG. 1B is a drawing for explaining a lost article management device in a vehicle according to an embodiment of the present disclosure.

DETAILED DESCRIPTION OF THE EMBODIMENTS

Figure 1A:
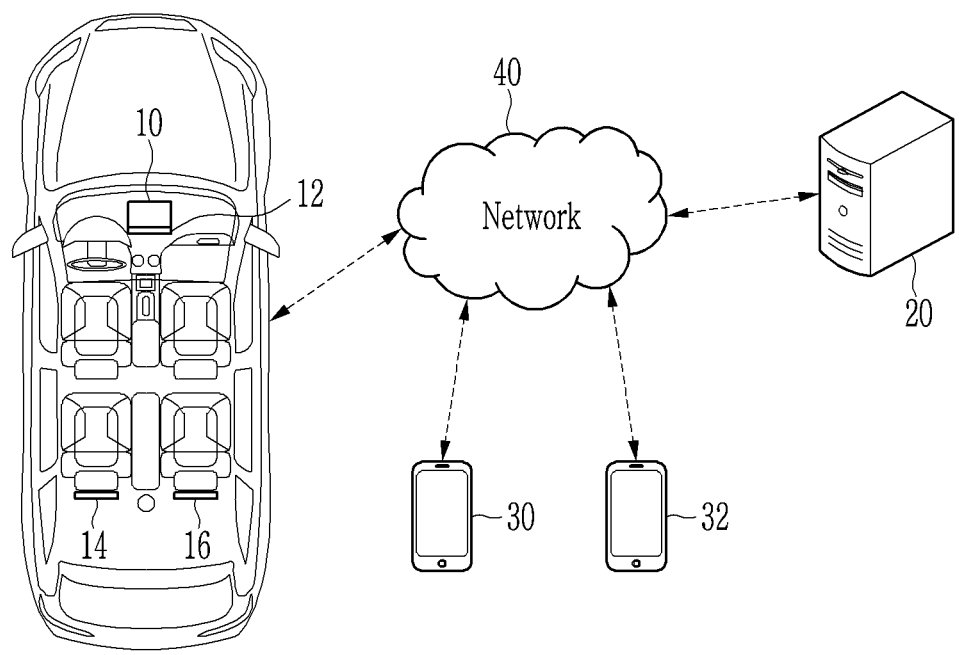
FIG. 1A is a drawing for explaining a lost article management system in a vehicle according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example, both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments disclosed in the present specification will be described in detail with reference to the accompanying drawings, and in the present specification, the same or similar constituent elements will be denoted by the same or similar reference numerals, and a redundant description thereof will be omitted. In addition, in describing embodiments of the present specification, when it is determined that a detailed description of the well-known art associated with the present disclosure may obscure the gist of the present disclosure, it will be omitted. Further, the accompanying drawings are provided only in order to allow embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various constituent elements, and are not to be interpreted as limiting these constituent elements. The terms are only used to differentiate one constituent element from other constituent elements.

It is to be understood that when one constituent element is referred to as being "connected" or "coupled" to another constituent element, it may be connected or coupled directly to the other constituent element or may be connected or coupled to the other constituent element with a further constituent element intervening therebetween. In contrast, it should be understood that, when it is described that an element is "directly coupled" or "directly connected" to another element, no element is present between the element and the other element.

FIG. 1A is a drawing for explaining a lost article management system in a vehicle according to an embodiment of the present disclosure, and FIG. 1B is a drawing for explaining a lost article management device in a vehicle according to an embodiment of the present disclosure.

Referring to FIG. 1A, a lost article management system 1 in a vehicle according to an embodiment of the present disclosure includes, in order to recognize a lost article in a vehicle and implement lost article confirmation request and lost article report functions, an in-vehicle infotainment device (IVI) 10, a plurality of display devices 12, 14, and 16, a server 20, and one or more user terminals 30 and 32. That is, the IVI 10, the plurality of display devices 12, 14, and 16, the server 20, and at least one user terminal 30 and/or 32 exchange data with each other through a network 40, and cooperate with each other, so that the lost article management system 1 in the vehicle may be implemented.

The IVI 10 may be a device that is installed in a vehicle to display vehicle-related information, provide various services by interworking with a navigation device and a mobile device, and provide an entertainment function such as music and image playback. To this end, the IVI 10, as exemplified in a computing device 50 shown in FIG. 10, includes a memory 530 and a storage device 560 in which software, programs, or codes for implementing a corresponding function may be stored, and a processor 510 that may execute a corresponding software, program, or code. In addition, the IVI 10 further includes a network interface 570 for supporting wired or wireless communication with other devices, and a user interface input device 540 and a user interface output device 550 for receiving input from a user or providing information to a user.

The display devices 12, 14, and 16 may display functions provided by the IVI 10 to a user. The display devices 12, 14, and 16 may be implemented as a liquid crystal display (LCD), a thin film transistor-liquid crystal display (TFT LCD), an organic light-emitting diode (OLED), a flexible display, a three-dimensional (3D) display, a touch display, and the like, but the present disclosure is not limited thereto.

The display devices 12, 14, and 16 may include a front seat display device 12 disposed in front between a driver seat and a passenger seat, and rear seat display devices 14 and 16 respectively disposed at rear sides of the driver seat and the passenger seat. However, the present disclosure is not limited thereto, and the number or arrangement position of the plurality of display devices in the vehicle may be changed to be different from that illustrated.

Figure 10:
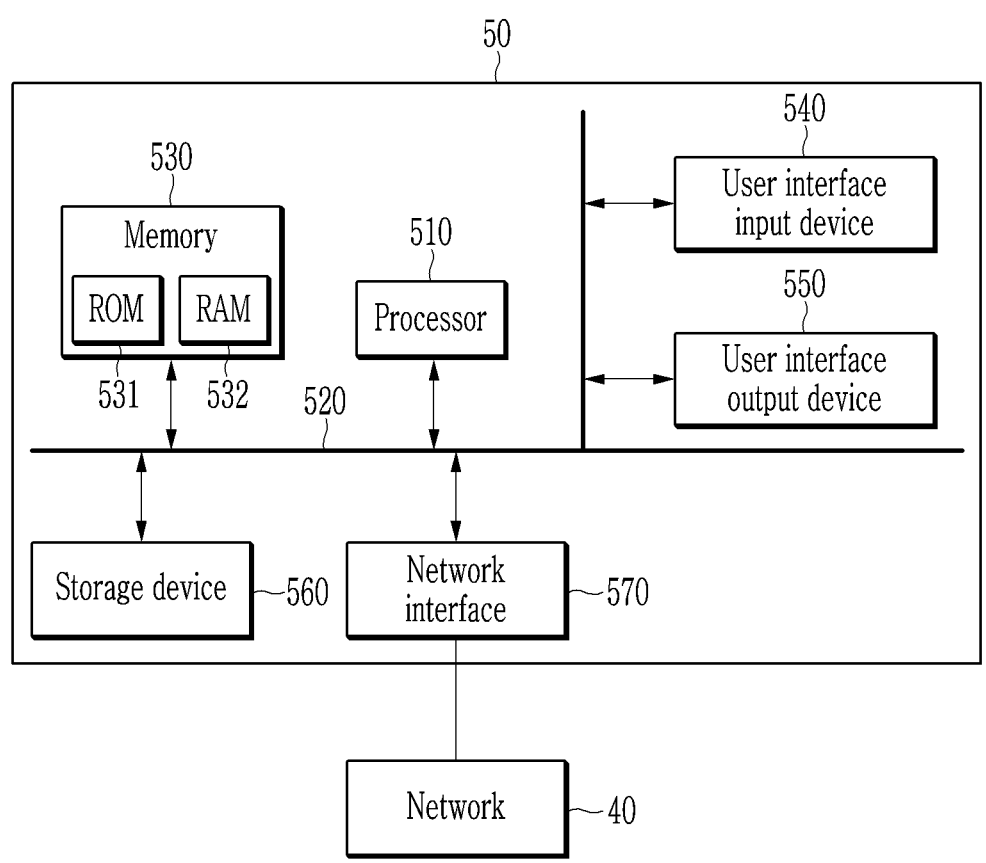
FIG. 10 is a block diagram for explaining a computing device for implementing a lost article management method and system in a vehicle according to an embodiment of the present disclosure.

The server 20 may implement at least some functions of the lost article management method in the vehicle in conjunction with the IVI 10 and the user terminals 30 and 32, and may be implemented in the same or similar configuration to the computing device 50 illustrated in FIG. 10. However, the server 20 is not limited to only a server as a physical device, and may mean a server instance in which a server program is executed.

The user terminals 30 and 32 may be personal terminals used by a passenger or driver using a vehicle. Typically, the user terminals 30 and 32 may be smartphones, but the present disclosure is not limited thereto, and they may include a computing device capable of being carried by a passenger or driver, such as a tablet computer, a wearable device (for example, a smart watch), or a laptop computer, and may be implemented in the same or similar configuration to the computing device 50 illustrated in FIG. 10.

Referring to FIG. 1B, the lost article management device in the vehicle implemented by using the above configurations may include a first detection information generating module 110, a second detection information generating module 120, a third detection information generating module 130, a prediction model providing module 140, a lost article occurrence determining module 150, a lost article confirmation request displaying module 160, and a lost article report processing module 170. These modules may be implemented as software, hardware, or a combination thereof on a system configured of the above-described devices.

These modules may be implemented as software executable in the IVI 10. Of course, the scope of the present disclosure is not limited thereto, and some of these may be implemented as executable software, in addition to the IVI 10, in the plurality of display devices 12, 14, and 16, the server 20, and one or more user terminals 30 and 32, or may be implemented by using an additional hardware device not specified above, for example, a hardware device customized for a specific purpose, such as an application-specific integrated circuit (ASIC) or a field programmable gate array (FPGA).

Specifically, a plurality of cameras or a plurality of sensors may be installed at various positions inside the vehicle. For example, the cameras or sensors may be installed in various positions such as a ceiling, a passenger seat, and a rear seat of the vehicle. In addition, a plurality of cameras or sensors may be disposed in several places on the ceiling of the vehicle or in several places in the rear seat. Here, the sensor may include a sensor capable of outputting a signal that may be used to detect a passenger or an article inside the vehicle, including a radar sensor, a lidar sensor, a pressure sensor, a weight sensor, and the like.

The first detection information generating module 110 may generate first detection information for detecting a passenger or an article by using a first camera or a first sensor installed in the vehicle to be separated by a first distance from a seated point of the passenger. For example, when the seated point of the passenger is in the rear seat, the first detection information generating module 110 may detect the passenger or article by using the first camera or the first sensor installed in the rear seat, and may generate the detection result as first detection information. Here, the first detection information may include information on whether a passenger or an article is detected within a range detectable by a camera or a sensor, and information on a position, size, shape, and the like thereof when it is detected.

The second detection information generating module 120 may generate second detection information for detecting a passenger or an article by using a second camera or a second sensor installed in the vehicle to be separated by a second distance from the seated point, and the second distance may be longer than the first distance. For example, when the seated point of the passenger is in the rear seat, the second detection information generating module 120 may detect the passenger or article by using the second camera or the second sensor installed on the ceiling of the vehicle, and may generate the detection result as second detection information. Here, the second detection information, similar to the case of the first detection information, may include information on whether a passenger or an article is detected within a range detectable by a camera or a sensor, and information on a position, size, shape, and the like thereof when it is detected.

When the seated point of the passenger is in the rear seat, the second distance to the second camera or second sensor installed on the ceiling of the vehicle is longer than the first distance to the first camera or the first sensor installed in the rear seat. That is, the lost article management system 10 in the vehicle may determine whether an article has been lost by collecting a plurality of pieces of detection information that may be obtained by diversifying the distance from the seated point in order to increase object tracking precision and lost article detection accuracy.

Since the second distance is longer than the first distance, the first detection information generating module 110 performs detection by using a camera or sensor disposed at a relatively short distance from the seated point of the passenger, and accordingly, the first detection information may also be referred to as "short-distance detection information". In addition, the second detection information generating module 120 performs detection by using a camera or sensor disposed at a relatively long distance from the seated point of the passenger, and accordingly, the second detection information may be referred to as "long-distance detection information". That is, after obtaining the short-distance detection information and long-distance detection information by using a plurality of cameras or a plurality of sensors disposed at positions having different distances from the seated point of the passenger, by overlapping and comparing and analyzing the short-distance detection information and the long-distance detection information, it is possible to increase the object tracking precision, thereby improving the lost article detection accuracy.

In order to determine whether or not an article has been lost, two pieces of detection information of a short distance and a long distance may be used, but the scope of the present disclosure is not limited thereto, and three or more pieces of detection information may be used. For example, in order to determine whether or not an article has been lost, detection information obtained from three positions: the rear seat, the position on the ceiling of the vehicle closest to the rear seat, and the position on the ceiling of the vehicle closest to the front seat, may be used, and when cameras or sensors are installed at more different positions in the vehicle, detection information obtained from four or more positions may be used.

Meanwhile, the first detection information generating module 110 and the second detection information generating module 120 may detect a passenger or an article at various times.

Specifically, the first detection information generating module 110 may detect a passenger or an article by using the first camera or the first sensor before the passenger gets in the vehicle, may detect a passenger or an article by using the first camera or the first sensor at a predetermined time interval after the passenger gets in the vehicle, or may detect a passenger or an article by using the first camera or the first sensor at a predetermined time before the passenger gets out of the vehicle.

In the meantime, the second detection information generating module 120 may detect a passenger or an article by using the second camera or the second sensor before the passenger gets in the vehicle, may detect a passenger or an article by using the second camera or the second sensor at a predetermined time interval after the passenger gets in the vehicle, or may detect a passenger or an article by using the second camera or the second sensor at a predetermined time before the passenger gets out of the vehicle.

The first detection information generating module 110 and the second detection information generating module 120 collect information on changes in a position of an object over time by detecting the passenger or the article at various time points as described above, and based on this, it may further refine object tracking and increase accuracy of loss article detection. To this end, a time point at which the first detection information generating module 110 and the second detection information generating module 120 perform the detection is not determined collectively, but may be variably determined according to a passenger's getting-in scenario.

For example, a detection time point may be determined according to a length of a distance in which the passenger uses the vehicle, and a long and short length of the use distance may be determined based on a distance to a destination or a time required to arrive at the destination. For example, a case in which a distance to a destination is 3 km or less or a case in which a required time is 20 minutes or less may be set as a short distance, a case in which a distance to a destination is 10 km or less or a case in which a required time is 40 minutes or less may be set as a middle distance, and other distances may be set as long sections, but the scope of the present disclosure is not limited thereto, and a criterion for dividing a distance or the number of divided distances may vary according to a specific implementation situation.

When a distance where the passenger uses the vehicle is short, it may be implemented to repeatedly perform detection at short time intervals (for example, time intervals of 1 minute), and when a distance where the passenger uses the vehicle is long, it may be implemented to repeatedly perform detection at long time intervals (for example, time intervals of 10 minutes). In addition, the time interval may be a constant time interval or a time interval having a variable length. For example, in the section where vehicle driving starts or ends, detection may be performed at shorter time intervals; in the middle section, detection may be performed at longer time intervals; and when there are 4 sections, detection may be performed at regular time intervals of 5 minutes, 5 minutes, 5 minutes, and 5 minutes, or may be performed at time intervals of 3 minutes, 7 minutes, 7 minutes, or 3 minutes.

As another example, the detection time point may be determined according to a change in a speed at which the vehicle moves. For example, when there is a lot of change in the moving speed of the vehicle, the detection may be repeatedly performed at short time intervals, and when there is a small change in the moving speed of the vehicle (for example, when the vehicle is driven on a high-speed road), the detection may be repeatedly performed at long time intervals.

As described above, efficient and precise detection may be implemented by customizing the number of detections, detection intervals, detection patterns, etc. according to the properties of the passenger's vehicle use distance or the properties of the vehicle operation.

The third detection information generating module 130 may generate third detection information that detects a background excluding a passenger and an article. That is, when the first detection information generating module 110 and the second detection information generating module 120 provide functions of tracking passengers and objects, the third detection information generating module 130 may provide a function of tracking a change of a background.

Specifically, the third detection information generating module 130 may minimize errors that may occur in object tracking and lost article detection by analyzing a change in a background excluding a passenger or an article. For example, the third detection information generating module 130 may transmit the result of detecting the change in the background to the lost article occurrence determining module 150 as third detection information to correct, for example, an error of mistaking an element detected due to a change in a background that is not a real article as a lost article.

In addition, the third detection information generating module 130 may classify an area of the background in which the passenger may put the article down and a prohibited area of the background in which the passenger may not put the article down. The result classified by the third detection information generating module 130 is transmitted to the lost article occurrence determining module 150 as third detection information, and may be used as information for determining whether an article has been lost, and further details related to this will be described later in relation to a lost status predicting model.

The first detection information generating module 110, the second detection information generating module 120, and the third detection information generating module 130 may perform detection within a predetermined detection area, and the predetermined detection area may be, for example, an area defined by a predetermined radius with respect to the seated point of the passenger.

Accordingly, at least one of the first detection information generating module 110, the second detection information generating module 120, or the third detection information generating module 130 may generate detection information for the area defined by a first radius with respect to the seated point, and then it may subsequently regenerate detection information for an area defined by a second radius different from the first radius. For example, although the detection is performed for the area defined by the first radius with respect to the seated point, when the object tracking fails, by increasing the detection radius, it is possible to re-detect the area defined by the second radius larger than the first radius with respect to the seated point. In addition, as necessary, first, the detection for the area defined by the second radius with respect to the seated point may be performed, and then the detection for the area defined by the first radius smaller than the second radius may be performed.

As described above, the detection information generated by the first detection information generating module 110, the second detection information generating module 120, and the third detection information generating module 130 may be provided to the lost article occurrence determining module 150.

The prediction model providing module 140 may provide a lost status predicting model generated through learning. That is, the prediction model providing module 140 may provide a plurality of models that are learned in order to predict a lost status by using an artificial intelligence technology such as machine learning.

The plurality of models may include a collection model, a dumping model, a lost model, a distance difference model, and the like. The lost article occurrence determining module 150 may use at least one of these models to predict the lost status from the detected information generated by the first detection information generating module 110, the second detection information generating module 120, and the third detection information generating module 130.

Specifically, the collection model may be a prediction model learned to classify a case in which an article is not collected for a predetermined time after it is dumped in a predetermined area. For example, the collection model in which it is detected that an article has been dumped in an empty seat where a passenger is not seated in the vehicle and that receives data indicating that the article is not collected until when or immediately before the passenger gets out of the vehicle, may provide data indicating probability that the corresponding article is a lost article to the lost article occurrence determining module 150.

The dumping model may be a prediction model learned to classify an action of a person placing an article in a predetermined area. For example, the collection model that receives the data that detects the action of the passenger placing the article on the empty seat where the passenger is not seated in the vehicle, may provide the data indicating the probability that the article is the lost article to the lost article determining module 150 by distinguishing whether the action was intentional or a mistake.

The lost model may be a prediction model learned to classify cases in which article placed in a predetermined prohibited area are not collected. For example, the lost model in which the article is detected in an area not normally touched by the passenger in the vehicle, for example, between a door and a seat, and that receives data indicating that the article is not collected until when or immediately before the passenger gets out of the vehicle, may provide data indicating probability that the corresponding object is a lost article to the lost article occurrence determining module 150.

The distance difference model may be a prediction model learned to determine whether an article has been lost from a position difference between a vehicle and an article. For example, when the article is an article that may be position-tracked by using a global positioning system (GPS) technology, the distance difference model receiving the data on the distance difference between the position of the vehicle and the position of the article may provide the data indicating the probability that the corresponding article is a lost article to the lost article determining module 150.

For training the collection model, the dumping model, the lost model, and the distance difference model, labeled learning data may be used, and the labeled learning data may include data prepared in advance, and may include data collected by obtaining feedback of prediction accuracy while the lost article occurrence determining module 150 predicts whether an article has been lost.

The lost article occurrence determining module 150, by using the lost status predicting model provided from the prediction model providing module 140, may determine whether an article has been lost from the first detection information to the third detection information. Specifically, the lost article occurrence determining module 150 may determine whether or not an article has been lost by using the collection model, the dumping model, the lost model, and the distance difference model, and may make prediction by using two or more models together as needed.

The lost article confirmation request displaying module 160, when it is determined that an article has been lost, may display a lost article confirmation request on a plurality of display devices installed in the vehicle. The plurality of display devices may display content to notify a passenger or driver that a lost article has been detected, and the passenger or driver may respond "Lost article finding completion", "Lost article reporting", "No lost article", and the like to the corresponding content. However, the lost article confirmation request may be displayed through an application executed on the user terminals 30 and 32 used by the passenger or the driver.

When it is determined that an article has been lost, the lost article report processing module 170 may provide a user interface for processing the lost article report through the plurality of display devices installed in the vehicle. When the passenger or driver inputs the lost article report through the user interface displayed on the plurality of display devices, the corresponding report content is transmitted to the IVI 10 or the server 20, and the report may be forwarded to the Lost and Found Center responsible for reporting a lost article. However, this lost article report processing procedure may be performed through an application executed on the user terminals 30 and 32 used by the passenger or the driver.

According to the present embodiment, as described above, by using the detection information generated by the first detection information generating module 110 to the third detection information generating module 130 and various prediction models provided by the prediction model providing module 140, it is possible to quickly and accurately recognize a lost article in the vehicle by considering various situations such as a position of an article in the vehicle, a placed cause of the article, and whether or not it is collected.

In addition, when it is determined that an article has been lost, it is possible to minimize occurrence of the lost article by immediately providing a request for confirmation of the lost article to a passenger, and to provide quick and convenient processing such as reporting of the lost article.

Figure 2A:
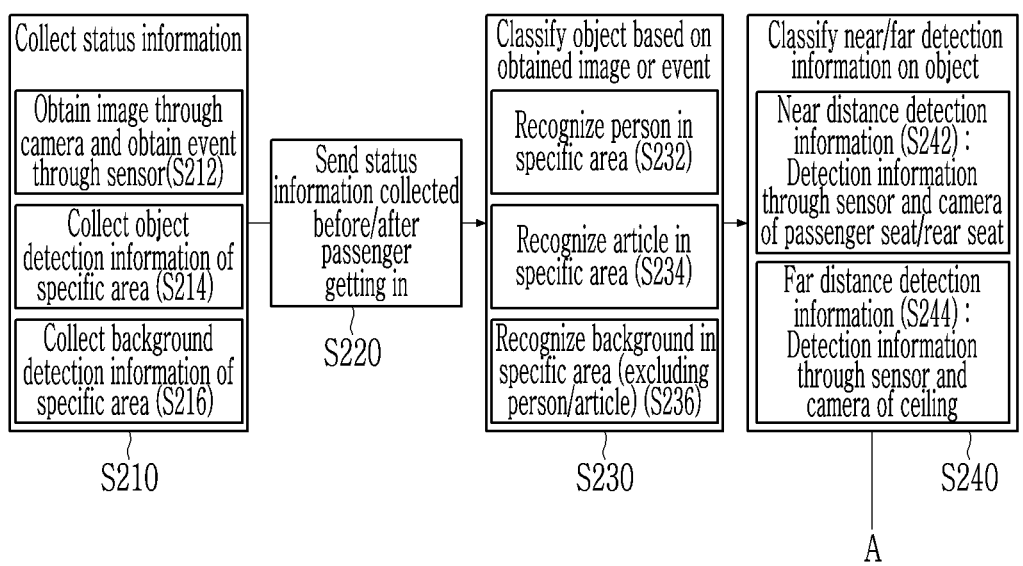
FIG. 2A and FIG. 2B are drawings for explaining a lost article management method in a vehicle according to an embodiment of the present disclosure.
Figure 2B:
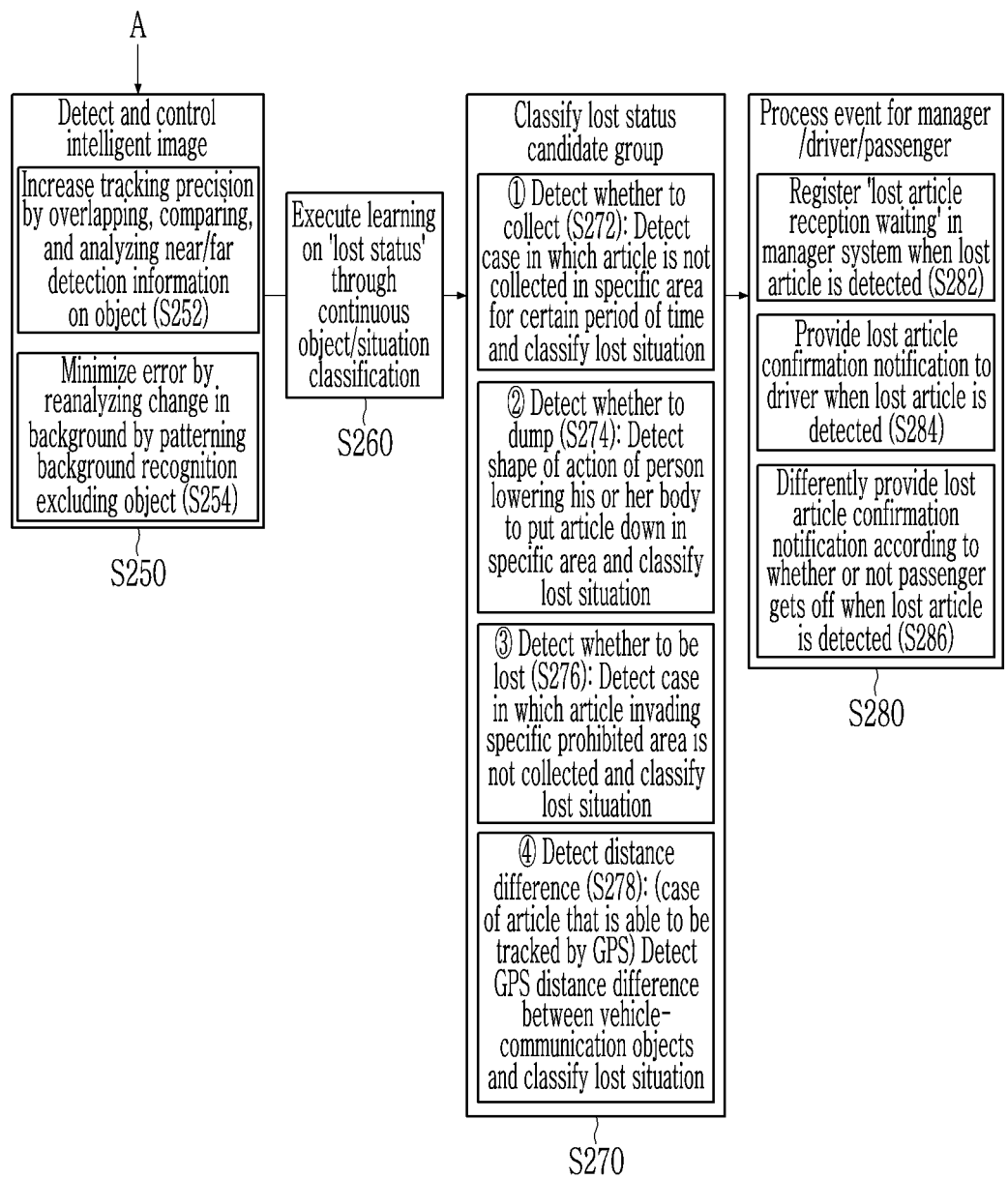

FIG. 2A and FIG. 2B are drawings for explaining a lost article management method in a vehicle according to an embodiment of the present disclosure.

Referring to FIG. 2A and FIG. 2B, a lost article management method in a vehicle according to an embodiment of the present disclosure may include a step of collecting status information (S210). Step S210 may include a step of obtaining an image through a camera and obtaining an event through a sensor (S212), a step of collecting object detection information of a specific area (S214), and a step of collecting background detection information of a specific area (S216). In addition, the method may include a step of transmitting status information collected before/after a passenger gets in (S220).

In addition, the method may include a step of classifying an object based on the obtained image or event (S230). Step S230 may include a step of recognizing a person in a specific area (S232), a step of recognizing an article in a specific area (S234), and a step of recognizing a background in a specific area excluding a person and an article (S236).

In addition, the method may include classifying near/far detection information on an object (S240). Step S240 may include a step of classifying detection information through a sensor and a camera of a passenger seat or rear seat as near-distance detection information (S242), and a step of classifying detection information through a sensor and a camera of a ceiling as far-distance detection information (S244).

In addition, the method may include a step of performing intelligent image detection and control (S250). Step S250 may include a step of increasing tracking precision by overlapping, comparing, and analyzing the near/far detection information on the object (S252), and a step of minimizing an error by reanalyzing a change in the background by patterning the background recognition excluding the object (S254). In addition, the method may include a step of executing learning on the 'lost status' through continuous object/situation classification (S260).

In addition, the method may include a step of classifying a lost status candidate group (S270). Step S270 may include a step of detecting whether to collect that detects a case in which an article is not collected in a specific area for a certain period of time and classifies a lost situation (S272), a step of detecting whether to dump that detects a shape of an action of a person lowering his or her body to put an article down in a specific area and classifies a lost situation (S274), a step of detecting whether to be lost that detects a case in which an article invading a specific prohibited area is not collected and classifies a lost situation (S276), and a step of detecting a distance difference that detects a GPS distance difference between vehicle-communication objects in a case of an article that is able to be tracked by a GPS and classifies a lost situation (S278).

In addition, the method may include a step of processing an event for a manager, a driver, or a passenger (S280). Step S280 may include a step of registering 'lost article reception waiting' in a manager system when a lost article is detected (S282), a step of providing lost article confirmation notification to a driver when a lost article is detected (S284), and a step of differently providing a lost article confirmation notification according to whether or not a passenger gets out when a lost article is detected (S286).

Figure 3A:
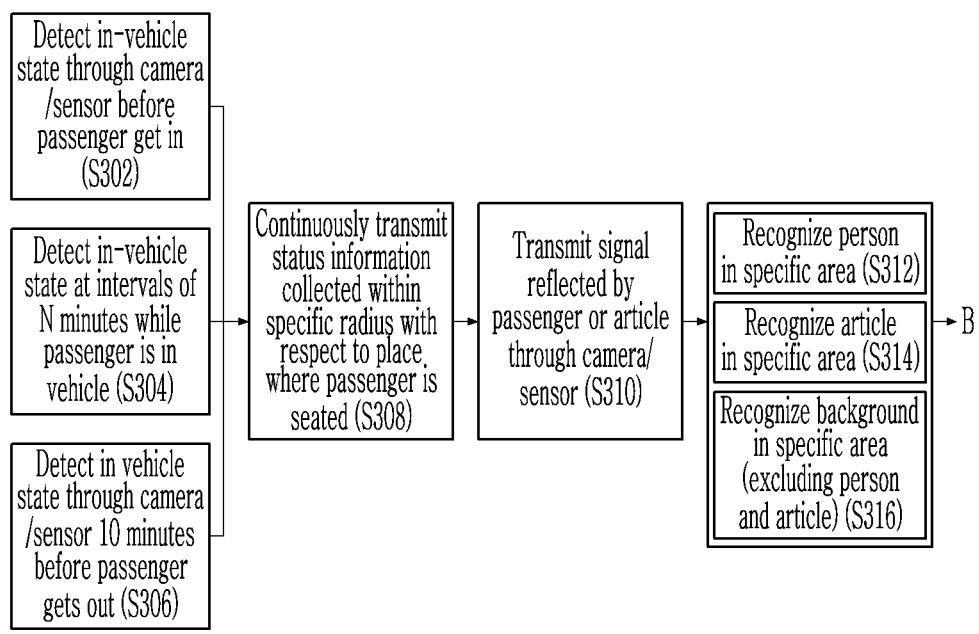
FIG. 3A and FIG. 3B are drawings for explaining a lost article management method in a vehicle according to an embodiment of the present disclosure.
Figure 3B:
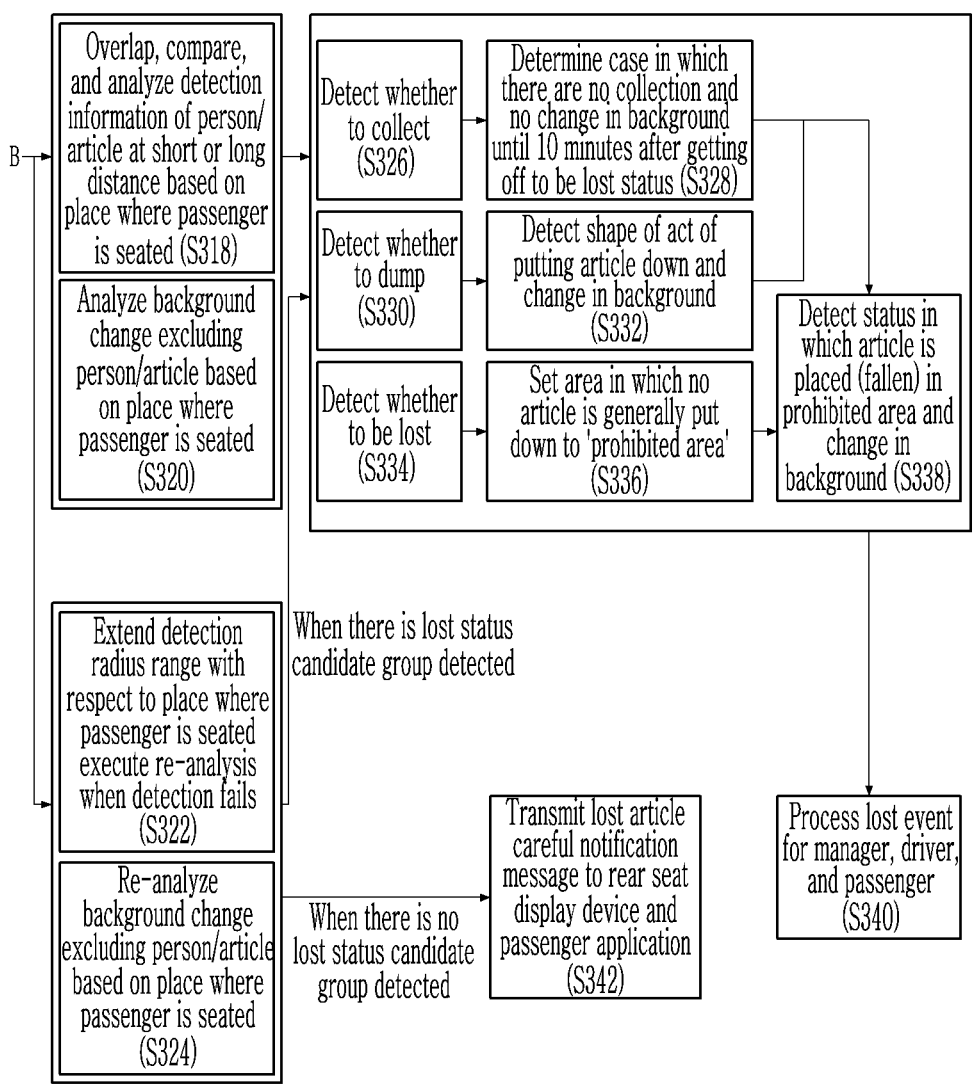

FIG. 3A and FIG. 3B are drawings for explaining a lost article management method in a vehicle according to an embodiment of the present disclosure.

Referring to FIG. 3A and FIG. 3B, a lost article management method in a vehicle according to an embodiment of the present disclosure may classify a human body and an article and may detect a movement, through image recognition information of a radar/pressure sensor and a camera of a passenger seat, a rear seat, and a ceiling in a vehicle. In addition, when a first detection fails, re-analysis is executed, and when there is no lost status candidate group detected, a careful notice of a lost article may be transmitted to a rear seat display device and a passenger application.

To this end, specifically, the method may include a step of detecting an in-vehicle state through a camera/sensor before a passenger gets in (S302), a step of detecting an in-vehicle state at intervals of N minutes while a passenger is in a vehicle (S304), and a step of detecting an in vehicle state through a camera and a sensor at 10 minutes before a passenger gets out (S306). In addition, the method may include a step of continuously transmitting status information collected within a specific radius with respect to a place where a passenger is seated (S308), and a step of transmitting a signal reflected by a passenger or article through a camera or sensor (S310). In this case, changes may be detected through camera/lidar/pressure and weight sensors, etc., and these changes may be double-detected near/far.

In addition, the method may include a step of recognizing a person in a specific area (S312), a step of recognizing an article in a specific area (S314), and a step of recognizing a background in a specific area excluding a person and an article (S316), and for these steps, near and far detection information may be generated or analyzed together.

In addition, the method may include, for intelligent image detection and control, a step of overlapping, comparing, and analyzing detection information of a person or an article in a short or long distance based on a place where a passenger is seated (S318), and a step of analyzing a background change excluding a person and an article based on a place where a passenger is seated (S320). When the detection fails, a step of extending a detection radius range with respect to a place where a passenger is seated and executing re-analysis (S322), and a step of re-analyzing a background change excluding a person and an article based on a place where a passenger is seated (S324) may be included.

When there is no lost status candidate group detected in steps S322 and S324, the method may proceed to step S342 of transmitting the lost article careful notification message to the rear seat display device and the passenger application, and when there is a lost status candidate group detected in steps S322 and S324, the method may proceed to the step of classifying the lost status candidate group.

The step of classifying the lost status candidate group may include a step of detecting whether to collect (S326), a step of determining a case in which there are no collection and no change in the background until 10 minutes after getting out to be a lost status (S328), a step of detecting whether to dump (S330), a step of detecting a shape of an act of putting an object down and a change in a background (S332), a step of detecting whether to be lost (S334), a step of setting an area in which no object is generally put down to a 'prohibited area' (S336), and a step of detecting a status in which an article is placed (fallen) in the prohibited area and a change in a background (S338). In this case, learning detecting shapes of dumping and collecting actions may be performed by detecting large movements of a shoulder, a head, etc. in relation to a passenger's action; learning may be performed by detecting changes in status such as collection, dumping, lost, distance difference in a specific area in relation to a change in an article; and learning may be performed by detecting a change in a background area excluding a person and an article in a specific area in relation to a background change.

In addition, the method may include a step of processing a lost event for a manager, a driver, and a passenger (S340), and details thereof will be described later with reference to FIG. 4A and FIG. 4B.

Figure 4A:
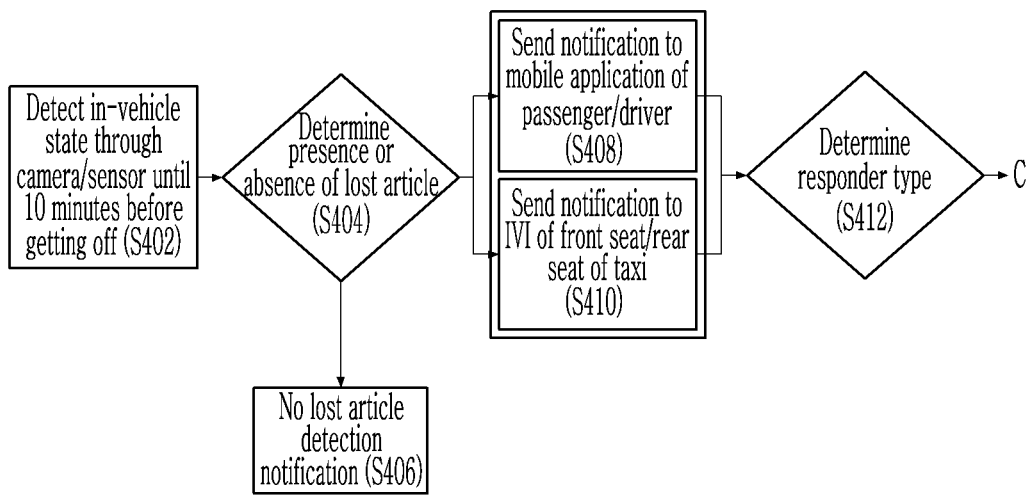
FIG. 4A and FIG. 4B are drawings for explaining a lost article management method in a vehicle according to an embodiment of the present disclosure.
Figure 4B:
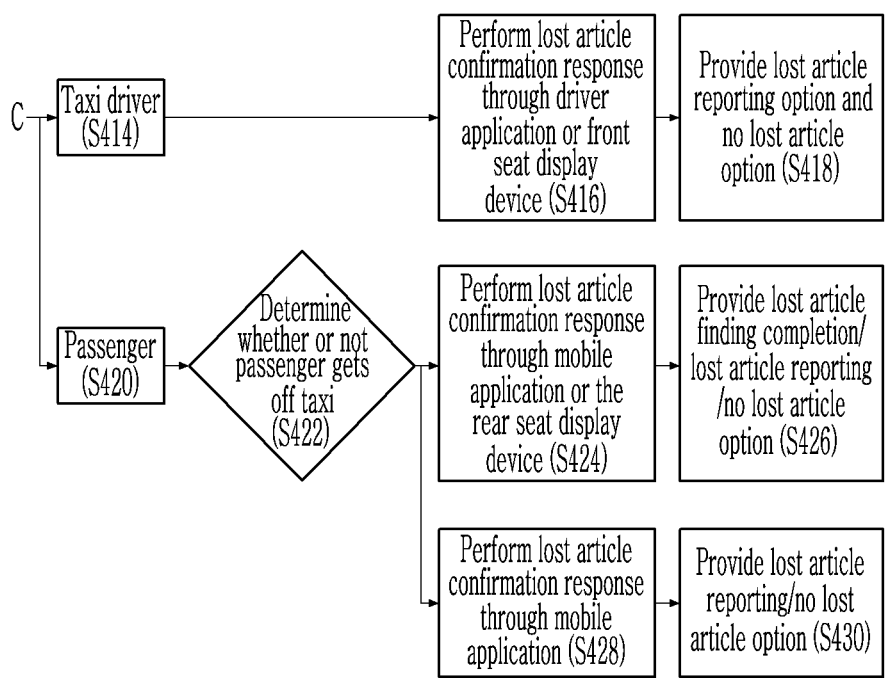

FIG. 4A and FIG. 4B are drawings for explaining a lost article management method in a vehicle according to an embodiment of the present disclosure.

Referring to FIG. 4A and FIG. 4B, the lost article management method in the vehicle according to the embodiment of the present disclosure provide a lost article confirmation request notification, when a lost article is detected, to a mobile application of a passenger and a driver and display devices of front and rear seats of a taxi, and when the lost article confirmation request notification is transmitted, a 'waiting for lost article reception' status may be registered to a customer center control system. In addition, the method allows the passenger to respond to the lost article confirmation request, and in this case, when the passenger does not get out of the taxi, it is possible to respond to the lost article confirmation request through the mobile application or the rear seat display (lost article finding completion/lost article reporting/no lost article), and when the passenger gets out of the taxi, it is possible to respond to the lost article confirmation request through the mobile application (lost article finding completion/lost article reporting/no lost article). In addition, the method may enable the driver to respond to the lost article confirmation request (lost article finding completion/lost article reporting/no lost article).

Specifically, the method may include a step of detecting the in-vehicle state through the camera or the sensor until 10 minutes before getting out (S402); a step of determining the presence or absence of the lost article (S404); a step of not generating the lost article detection notification when it is determined that there is no lost article (S406); and a step of sending the notification when it is determined that there is a lost article.

The step of sending the notification may include a step of sending the notification to the mobile applications of the passenger and the driver (S408), and a step of sending the notification to the display devices of the front and rear seats of the taxi (S410).

In addition, the method may include a step of determining a responder type (S412), a step of determining that the responder type is a taxi driver (S414), and a step of determining that the responder type is a passenger (S420). Subsequent to step S414, the method may include a step of performing the lost article confirmation response through the driver application or the front seat display device (S416), and a step of providing a lost article reporting option and a no lost article option (S418). Meanwhile, subsequent to step S420, the method may include a step of determining whether or not the passenger gets out of the taxi (S422); when the passenger does not get out, a step of performing the lost article confirmation response through the mobile application or the rear seat display device (S424) and a step of providing the lost article finding completion/lost article reporting/no lost article options (S426); and when the passenger gets out, a step of performing the lost article confirmation response through the mobile application (S428) and a step of providing the lost article reporting/no lost article options (S430).

Figure 5A:
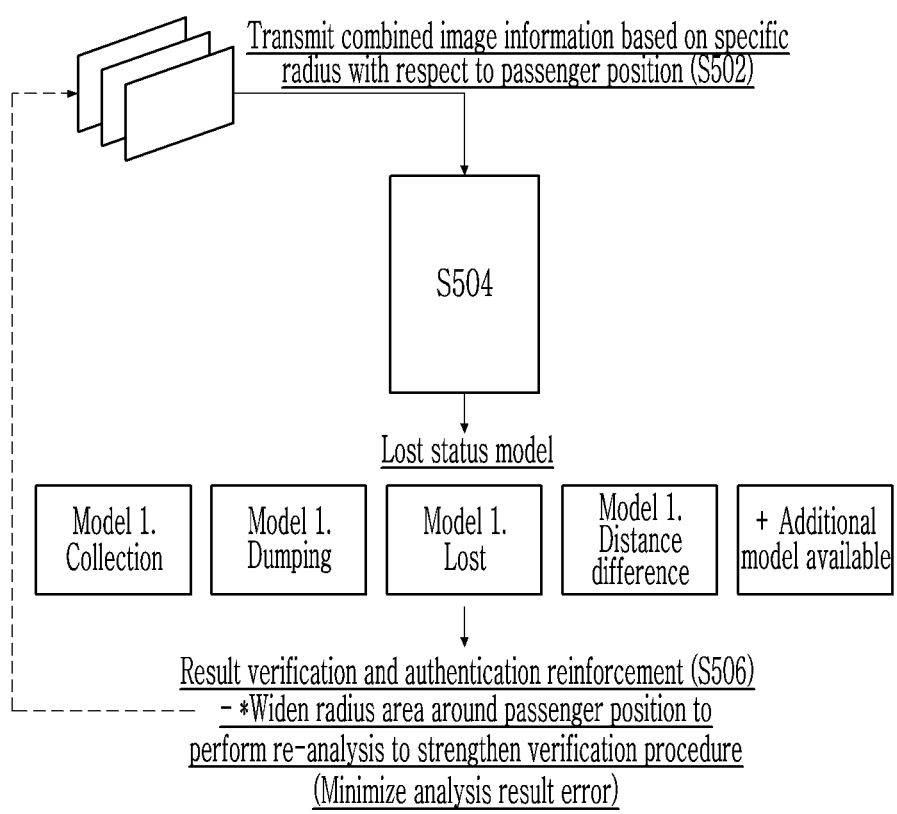
FIG. 5A and FIG. 5B are drawings for explaining a lost article management method in a vehicle according to an embodiment of the present disclosure.
Figure 5B:
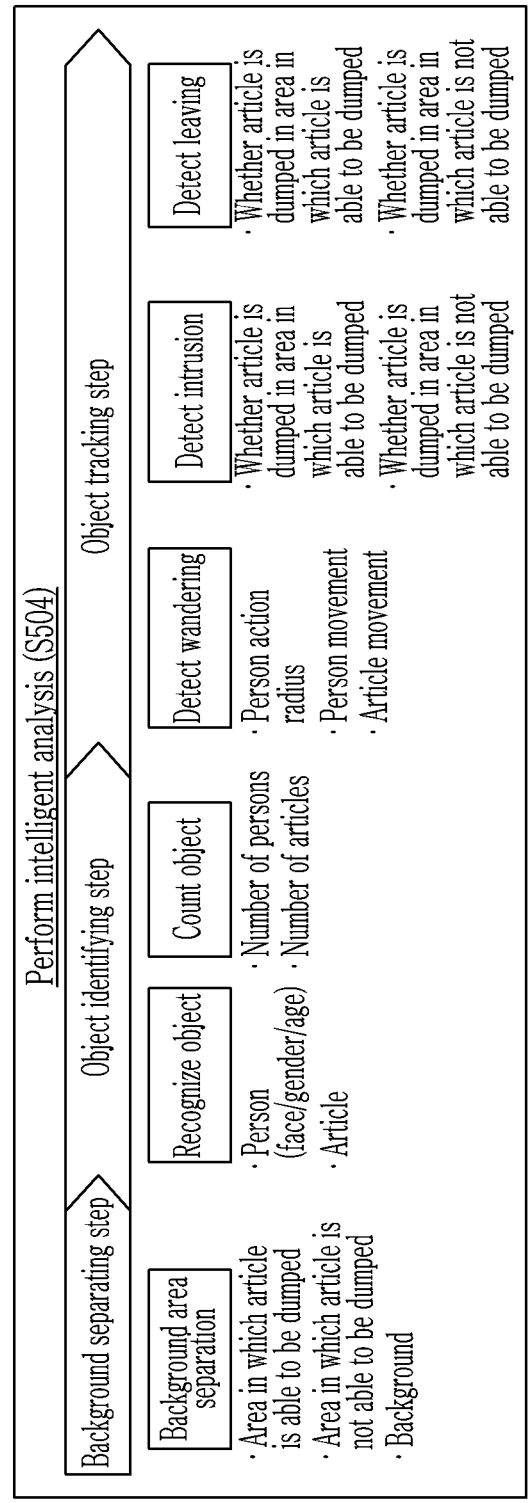

FIG. 5A and FIG. 5B are drawings for explaining a lost article management method in a vehicle according to an embodiment of the present disclosure.

Referring to FIG. 5A and FIG. 5B, learning to detect a lost article may be performed in the following method. It is possible to combine multiple image frames and image sets through a camera, and perform intelligent analysis through various analysis modules and sensor detection information after obtaining the combined image.

A background separating step may be performed as a first step. A background area separating module may classify an area inside a vehicle in which an article may be placed, a prohibited area inside the vehicle in which an article may not be placed (under a seat, etc.), and a background excluding a person, an article, and a specific area other than them.

An object identification step may be performed as a second step. An object recognizing module may classify a person and an article detected inside of the vehicle, may recognize a human face, and may recognize a person's gender and age, and an object counting module may determine the number of objects (the number of persons and articles) detected inside of the vehicle.

An object tracking step may be performed as a third step. A wandering detecting module may track a direction and trajectory (motion radius and movement line) of an object detected in the vehicle interior, an intrusion detecting module may detect a degree of proximity between a target object and a specific area (whether an article is dumped in the vehicle interior area in which an object may be put down and the prohibited area), and a leaving detecting module may detect a degree of proximity between the target object and the vehicle (a distance difference between a communication object and the vehicle).

The intelligent analysis may be performed by comparing and analyzing each status of 'before passenger getting in-after passenger getting in-passenger getting out', and 'lost status model' training may be performed with patterns learned through each module and sensor. For example, the collection model may learn a pattern of a case in which an article is dumped in a specific area and then is not collected until just before getting out, and the dumping model may learn a pattern by detecting an action shape of a person placing an article in a specific area. The lost model may learn a pattern of a case in which there is an article that invades a specific prohibited area and it is not collected until just before getting out, and the distance difference model may learn a pattern of a case in which a distance difference between the communication object and the vehicle exceeds a specific radius or more.

In addition, in order to execute an event according to the lost status model, when it is determined that there is the lost status, a lost article detection action and a lost article process may be performed.

In relation to the lost article detection learning method described above, the method may include a step of transmitting the combined image information based on a specific radius with respect to a passenger position (S502), a step of performing the intelligent analysis of the background separating step, the object identifying step, and the object tracking step by using a plurality of lost status models obtained through model advancement through continuous pattern learning training (S504), and a step of minimizing an analysis result error by widening the radius area around the passenger position to perform the re-analysis to strengthen the verification procedure in order to perform the result verification and the authentication reinforcement (S506).

Figure 6A:
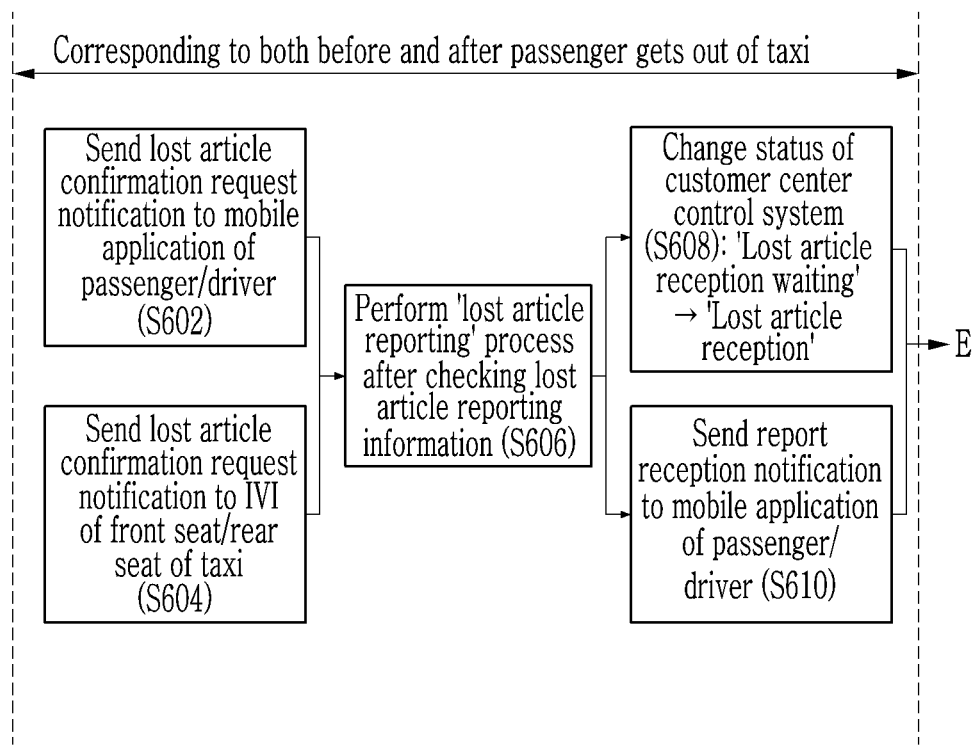
FIG. 6A and FIG. 6B are drawings for explaining a lost article management method in a vehicle according to an embodiment of the present disclosure.
Figure 6B:
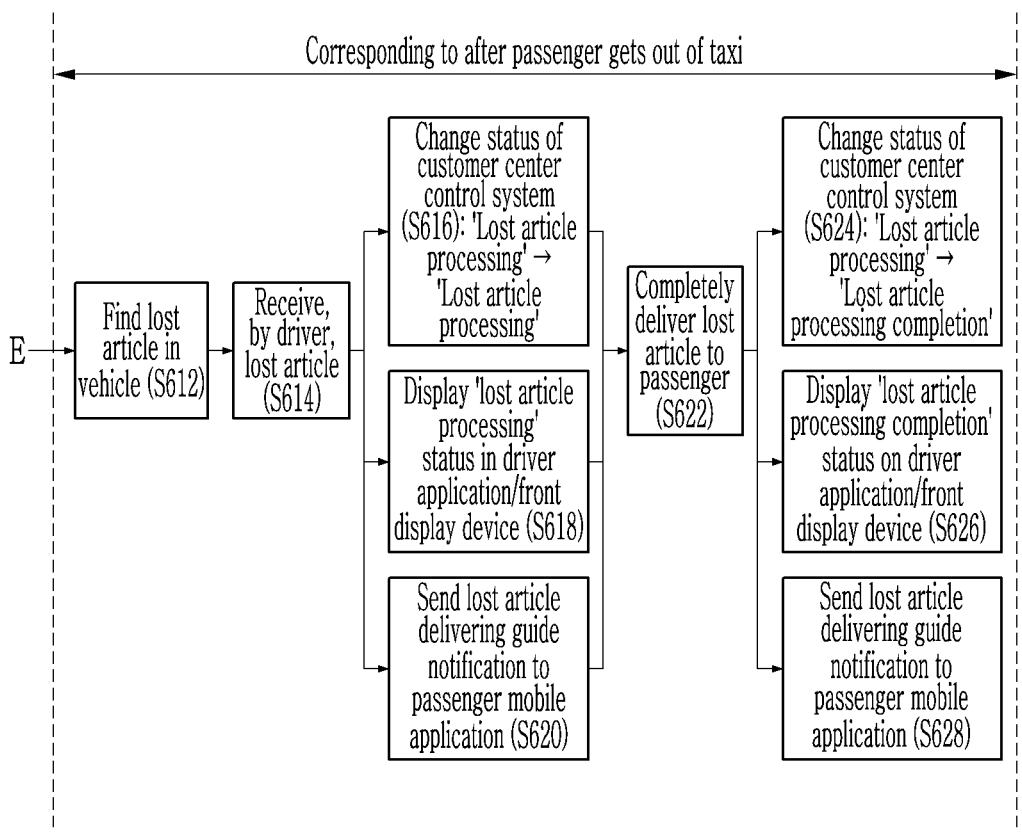

FIG. 6A and FIG. 6B are drawings for explaining a lost article management method in a vehicle according to an embodiment of the present disclosure.

Referring to FIG. 6A and FIG. 6B, the lost article management method in the vehicle according to the embodiment of the present disclosure may perform a 'lost article reporting' process as follows when there is a lost article.

First, a lost article detection notification information input menu is provided in passenger and driver applications or in taxi front and rear display devices to input passenger information, driver and vehicle information, and lost article item information; after checking displayed information, when a 'lost article reporting' process is completed, a customer center control system is updated to a 'lost article reception' status; and a report-reception notification may be sent to a mobile application or a taxi display device.

When a lost article is found in the vehicle, the driver may process reception in a lost article reception menu, and may provide passenger information, lost article item information, customer center reception, and lost article guidance information by using the lost article reception menu in the driver application or the front display device.

Then, after updating the customer center control system to a 'lost article processing' status, and after updating the driver application and the front display device to a 'lost article processing' status, lost article delivering guidance may be transmitted to the customer application or notification talk.

When the lost article has been delivered to the passenger, after updating the customer center control system to a 'lost article processing completion' status, and after updating the driver application or the front display device to a 'lost article processing completion' status, lost article delivering completion guidance may be transmitted to the customer application or notification talk.

In relation to the process described above, the method may include: a step of sending a lost article confirmation request notification to the mobile application of the passenger or driver (S602); a step of sending a lost article confirmation request notification to the front or rear seat display device of the taxi (S604); after checking lost article reporting information, a step of performing a 'lost article reporting' process (S606); a step of changing a status of the customer center control system from 'lost article reception waiting' to 'lost article reception' (S608); and a step of sending a report reception notification to the mobile applications of the passenger and the driver (S610). Steps S602 to S610 may be applied both before and after the passenger gets out of the taxi.

In addition, the method may include: a step in which a lost article is found in the vehicle (S612); a step of receiving, by the driver, the lost article (S614); a step of changing a status of the customer center control system from 'lost article reception' to 'lost article processing' (S616); a step of displaying a 'lost article processing' status in the driver application and the front display device (S618); and a step of sending a lost article delivering guide notification to the passenger mobile application (S620).

In addition, the method may include: a step in which the lost article has been delivered to the passenger (S622); a step of changing a status of the customer center control system from 'lost article processing' to 'lost article processing completion' (S624); a step of displaying a 'lost article processing completion' status on the driver application and the front display device (S626); and a step of sending a lost article delivering guide notification to the passenger mobile application (S628). Steps S612 to S628 may be applied after the passenger gets out of the taxi.

Figure 7:
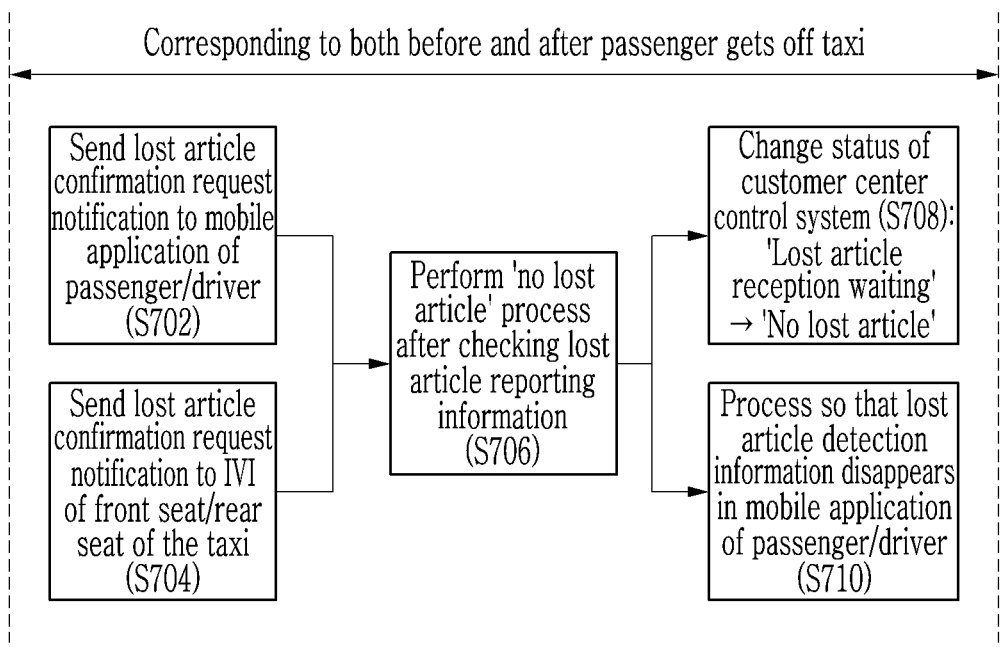
FIG. 7 is a drawing for explaining a lost article management method in a vehicle according to an embodiment of the present disclosure.

FIG. 7 is a drawing for explaining a lost article management method in a vehicle according to an embodiment of the present disclosure.

Referring to FIG. 7, the lost article management method in the vehicle according to the embodiment of the present disclosure may perform a 'no lost article' process as follows.

A lost article detection notification information input menu is provided in passenger and driver applications or in taxi front and rear display devices to input passenger information, driver and vehicle information, and lost article item information; and after checking displayed information, the 'no lost article' process is completed, and a status of the customer center control system may be updated to 'no lost article'.

In relation to the process described above, the method may include: a step of sending a lost article confirmation request notification to the mobile applications of the passenger and the driver (S702); a step of sending a lost article confirmation request notification to the display devices of the front and rear seats of the taxi (S704); after checking lost article reporting information, a step of performing a 'no lost article' process (S706); a step of changing a status of the customer center control system from 'lost article reception waiting' to 'no lost article' (S708); and a step of processing so that the lost article detection information disappears in the mobile applications of the passenger and the driver (S710). Steps S702 to S710 may be applied both before and after the passenger gets out of the taxi.

Figure 8:
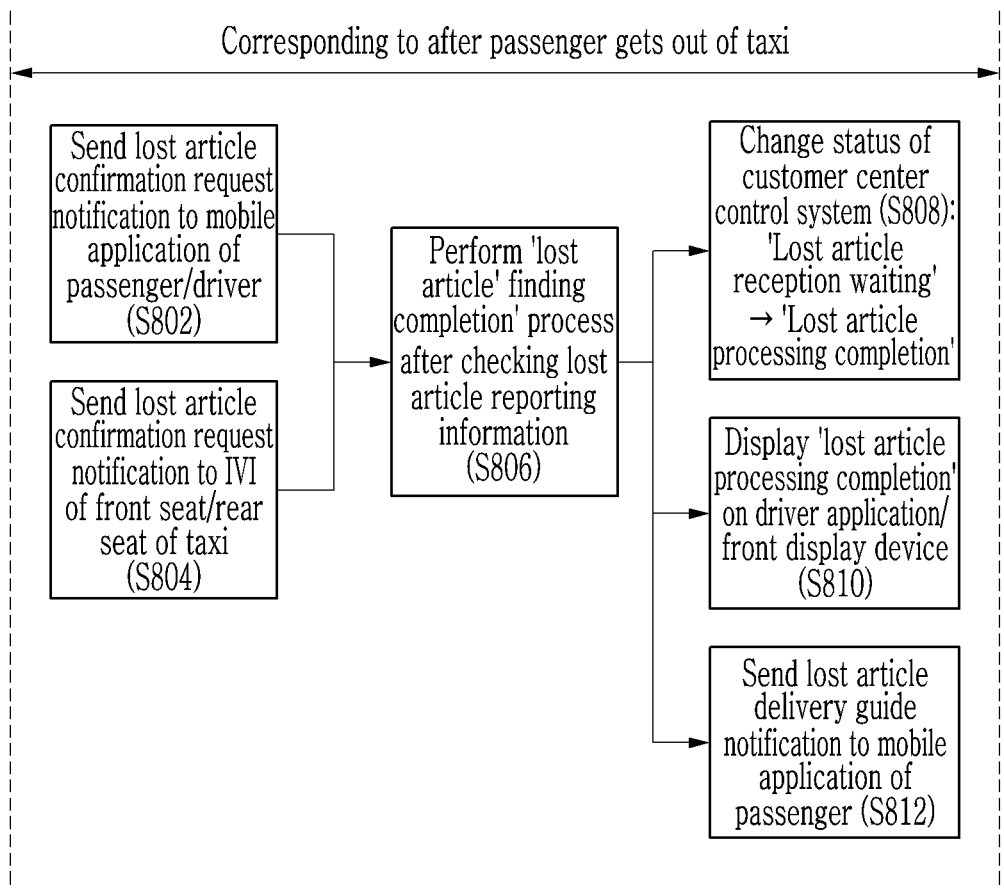
FIG. 8 is a drawing for explaining a lost article management method in a vehicle according to an embodiment of the present disclosure.

FIG. 8 is a drawing for explaining a lost article management method in a vehicle according to an embodiment of the present disclosure.

Referring to FIG. 8, the lost article management method in the vehicle according to the embodiment of the present disclosure may perform a 'lost article finding completion' process as follows.

A lost article detection notification information input menu is provided in passenger and driver applications or in taxi front and rear display devices; after checking displayed information, the 'lost article finding' process is completed, and a status of the customer center control system is updated to 'lost article processing completion'; and after updating a status of the driver application or the front display device to the 'lost article processing completion', lost article delivering completion guidance may be transmitted to the customer application or notification talk.

In relation to the process described above, the method may include: a step of sending a lost article confirmation request notification to the mobile applications of the passenger and the driver (S802); a step of sending a lost article confirmation request notification to the display devices of the front and rear seats of the taxi (S804); after checking the lost article reporting information, a step of performing a 'lost article finding completion' process (S806); a step of changing a status of the customer center control system from 'lost article reception waiting' to 'lost article processing completion' (S808); a step of displaying the 'lost article processing completion' in the driver application and the front display device (S810); and a step of sending a lost article delivery guide notification to the mobile application of the passenger (S812). Steps S802 to S812 may be applied before the passenger gets out of the taxi.

Figure 9A:
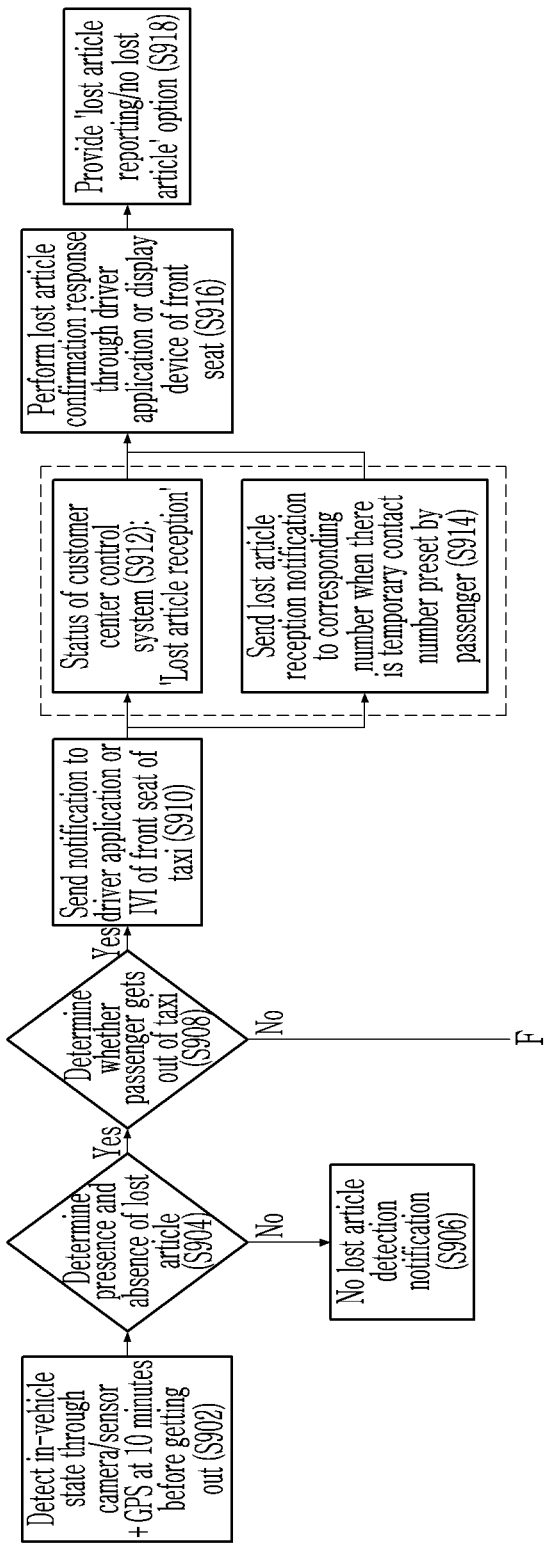
FIG. 9A and FIG. 9B are drawings for explaining a lost article management method in a vehicle according to an embodiment of the present disclosure.
Figure 9B:
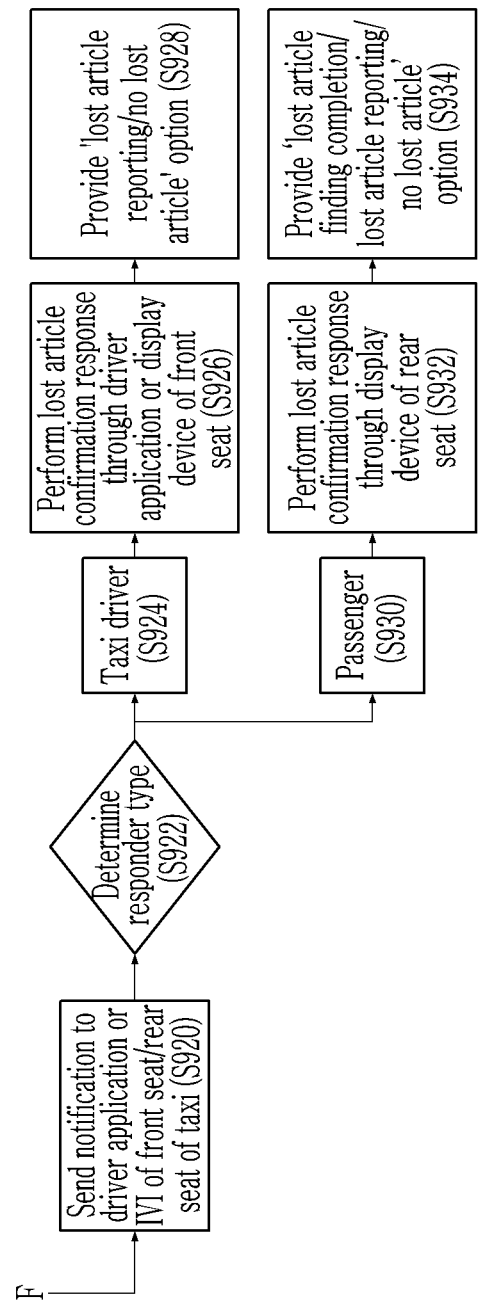

FIG. 9A and FIG. 9B are drawings for explaining a lost article management method in a vehicle according to an embodiment of the present disclosure.

Referring to FIG. 9A and FIG. 9B, the lost article management method in the vehicle according to the embodiment of the present disclosure may perform a lost article detecting process as follows in a case in which a lost article is one that may be tracked by a GPS such as a mobile device.

Presence and absence of a lost article through 'camera/sensor detection+distance difference between taxi GPS and mobile device GPS' is determined at 10 minutes before getting out; when the lost article is detected, a lost article confirmation request notification is provided to an appropriate display device according to whether or not the passenger is in a taxi; and in this case, when the passenger gets out of the taxi, a notification may be sent to the driver application or to the display device of the front seat of the taxi; and when the passenger does not get out of the taxi, a notification may be sent to the driver application or to the display devices of the front and rear seats of the taxi.

When sending the lost article confirmation request notification, 'lost article reception waiting' may be registered in the customer center control system; when the passenger does not get out of the taxi, a response to the lost article confirmation request may be received through the rear seat display device as 'lost article finding completion, report lost article, or no lost article'; and when the passenger gets out of the taxi, the lost article may be automatically reported to the customer center, and when there is a temporary contact number preset by the passenger, the lost article reception notification may be sent to that number. Other than that, when the passenger does not respond, the driver may respond to the lost article confirmation request as 'lost article reporting or no lost article'.

In relation to the process described above, the method may include: a step of detecting an in-vehicle state through a camera, a sensor, and a GPS at 10 minutes before getting out (S902); a step of determining presence and absence of a lost article (S904); when it is determined that there is no lost article, a step of not generating a lost article detection notification (S906); and when it is determined that there is a lost article, a step of determining whether the passenger gets out of the taxi (S908).

When the passenger gets out of the taxi, the method may include: a step of sending a notification to the driver application or the display device of the front seat of the taxi (S910); a step of setting a status of the customer center control system to 'lost article reception' (S912); when there is a temporary contact number preset by the passenger, a step of sending a lost article reception notification to the corresponding number (S914); a step of performing a lost article confirmation response through the driver application or the display device of the front seat (S916); and a step of providing a 'lost article reporting/no lost article' option (S918). Particularly, in relation to steps S912 and S914, when the passenger gets out of the taxi and the mobile application is unavailable, the lost article is automatically reported, and information about the lost article reception and processing may be automatically notified to a preset temporary number.

When the passenger does not get out of the taxi, the method may include: a step of sending a notification to the driver application or the display devices of the front and rear seats of the taxi (S920); a step of determining a responder type (S922); a step of determining that the responder type is a taxi driver (S924); a step of performing a lost article confirmation response through the driver application or the display device of the front seat (S926); and a step of providing a lost article reporting/no lost article option (S928). In addition, the method may include: a step of determining that the responder type is a passenger (S930); a step of performing the lost article confirmation response through the rear seat display device (S932); and a step of providing lost article finding completion/lost article reporting/no lost article options (S934).

Referring to FIG. 10, the lost article management method, device, and system in the vehicle according to the embodiments of the present disclosure may be implemented by using the computing device 50.

The computing device 50 may include at least one of a processor 510, a memory 530, a user interface input device 540, a user interface output device 550, or a storage device 560 in communication through a bus 520. The computing device 50 may also include a network interface 570 electrically connected to the network 40, for example, a wireless network. The network interface 570 may transmit or receive signals with other objects through the network 40, and may include at least one of a wired network interface for supporting connection of a wired network including a local area network (LAN) or a wireless network interface for supporting connection of a wireless network including a WiFi network, a cellular network, a Bluetooth network, and the like.

The processor 510 may be implemented in various types such as an application processor (AP), a central processing unit (CPU), and a graphics processing unit (GPU), and may be a semiconductor device that executes instructions stored in the memory 530 or the storage device 560. The processor 510 may be configured to implement the functions and methods described with reference to FIG. 1A to FIG. 9B.

The memory 530 and the storage device 560 may include various types of volatile or non-volatile storage media. For example, the memory may include a read-only memory (ROM) 531 and a random access memory (RAM) 532. In the embodiment of the present disclosure, the memory 530 may be positioned inside or outside the processor 510, and the memory 530 may be connected to the processor 510 through a known connection device.

In addition, at least some of the lost article management method, device, and system in the vehicle according to the embodiments of the present disclosure may be implemented as a program or software executed in the computing device 50, and the program or software may be stored in a computer-readable medium.

In addition, at least some of the lost article management method, device, and system in the vehicle according to the embodiments of the present disclosure may be implemented as hardware that may be electrically connected to the computing device 50.

According to the embodiments of the present disclosure described above, by using detection information generated by a plurality of detection information generating modules and various prediction models provided by a prediction model providing module, it is possible to quickly and accurately recognize a lost article in a vehicle by considering various situations such as a position of an article in the vehicle, a cause of placement of the article, and whether or not the article is collected. In addition, when it is determined that an article has been lost, it is possible to minimize occurrence of the lost article by immediately providing a request for confirmation of the lost article to a passenger, and to provide quick and convenient processing such as reporting of the lost article.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A lost article management method in a vehicle, comprising:
    generating first detection information by detecting a passenger or an article by using a first camera or first sensor that is installed in the vehicle to be separated by a first distance from a seated point of the passenger;
    generating second detection information by detecting the passenger or the article by using a second camera or second sensor that is installed in the vehicle to be separated by a second distance from the seated point, wherein the second distance is longer than the first distance;
    generating third detection information by detecting a background excluding the passenger and the article;
    providing a lost status prediction model generated through learning;
    determining whether an article has been lost from the first detection information to the third detection information by using the lost status prediction model; and providing a lost article confirmation request to the passenger when it is determined that the article has been lost;

wherein the generating of the third detection information includes classifying the background into an area in which the passenger is able to put the article down and a prohibited area in which the passenger is not able to put the article down.

2. The lost article management method in the vehicle of claim 1, wherein the generating of the first detection information includes at least one of:

detecting the passenger or the article by using the first camera or the first sensor before the passenger gets in the vehicle;

detecting the passenger or the article by using the first camera or the first sensor at a predetermined time interval after the passenger gets in the vehicle; or detecting the passenger or the article by using the first camera or the first sensor at a predetermined time point before the passenger gets out of the vehicle.

3. The lost article management method in the vehicle of claim 1, wherein the generating of the second detection information includes at least one of:

detecting the passenger or the article by using the second camera or the second sensor before the passenger gets in the vehicle;

detecting the passenger or the article by using the second camera or the second sensor at a predetermined time interval after the passenger gets in the vehicle; or detecting the passenger or the article by using the second camera or the second sensor at a predetermined time point before the passenger gets out of the vehicle.

4. The lost article management method in the vehicle of claim 1, wherein:

the lost status prediction model includes a collection model, and the collection model is learned to classify a case in which an article is dumped in a predetermined area and then is not collected for a predetermined time.

5. The lost article management method in the vehicle of claim 1, wherein:

the lost status prediction model includes a dumping model, and the dumping model is learned to classify an action of a person placing an article in a predetermined area.

6. The lost article management method in the vehicle of claim 1, wherein:

the lost status prediction model includes a lost model, and the lost model is learned to classify a case in which an article placed in a predetermined forbidden area is not collected.

7. The lost article management method in the vehicle of claim 1, wherein:

the lost status prediction model includes a distance difference model, and the distance difference model is learned to determine whether an article has been lost from a position difference between a vehicle and the article.

8. The lost article management method in the vehicle of claim 1, wherein at least one of the generating of the first detection information, the generating of the second detection information, or the generating of the third detection information is performed for an area defined by a first radius with respect to the seated point, and then is performed again for an area defined by a second radius larger than the first radius.

9. The lost article management method in the vehicle of claim 1, further comprising:

when it is determined that the article has been lost, displaying the lost article confirmation request on a plurality of display devices installed in the vehicle; and providing a user interface for a lost article reporting process through the plurality of display devices installed in the vehicle.

10. A lost article management device in a vehicle, comprising:

a memory configured to store instructions;

a processor configured to execute the instructions in the memory, wherein the instructions, when executed:

generate first detection information by detecting a passenger or an article by using a first camera or first sensor that is installed in the vehicle to be separated by a first distance from a seated point of the passenger;

generate second detection information by detecting the passenger or the article by using a second camera or second sensor that is installed in the vehicle to be separated by a second distance from the seated point, wherein the second distance is longer than the first distance;

generate third detection information by detecting a background excluding the passenger and the article;

provide a lost status prediction model generated through learning;

determine whether an article has been lost from the first detection information to the third detection information by using the lost status prediction model; and provide a lost article confirmation request to the passenger when it is determined that the article has been lost;

wherein the generating of the third detection information includes classifying the background into an area in which the passenger is able to put the article down and a prohibited area in which the passenger is not able to put the article down.

11. The lost article management device in the vehicle of claim 10, wherein the generating of the first detection information includes at least one of:

detecting the passenger or the article by using the first camera or the first sensor before the passenger gets in the vehicle, detecting the passenger or the article by using the first camera or the first sensor at a predetermined time interval after the passenger gets in the vehicle, or detecting the passenger or the article by using the first camera or the first sensor at a predetermined time point before the passenger gets out of the vehicle.

12. The lost article management device in the vehicle of claim 10, wherein the generating of the second detection information includes at least one of:

detecting the passenger or the article by using the second camera or the second sensor before the passenger gets in the vehicle, detecting the passenger or the article by using the second camera or the second sensor at a predetermined time interval after the passenger gets in the vehicle, or detecting the passenger or the article by using the second camera or the second sensor at a predetermined time point before the passenger gets out of the vehicle.

13. The lost article management device in the vehicle of claim 10, wherein:

the lost status prediction model includes a collection model, and the collection model is learned to classify a case in which an article is dumped in a predetermined area and then is not collected for a predetermined time.

14. The lost article management device in the vehicle of claim 10, wherein:
the lost status prediction model includes a dumping model, and
the dumping model is learned to classify an action of a person placing an article in a predetermined area.

15. The lost article management device in the vehicle of claim 10, wherein:
the lost status prediction model includes a lost model, and
the lost model is learned to classify a case in which an article placed in a predetermined forbidden area is not collected.

16. The lost article management device in the vehicle of claim 10, wherein:
the lost status prediction model includes a distance difference model, and
the distance difference model is learned to determine whether an article has been lost from a position difference between a vehicle and an article.

17. The lost article management device in the vehicle of claim 10, wherein at least one of the generating of the first detection information, the generating of the second detection information, and the generating of the third detection information is performed for an area defined by a first radius with respect to the seated point, and then re-generates detection information for an area defined by a second radius larger than the first radius.

18. The lost article management device in the vehicle of claim 10, wherein the instructions, when executed:
display the lost article confirmation request on a plurality of display devices installed in the vehicle when it is determined that the article has been lost, and
provide a user interface for a lost article reporting process through the plurality of display devices installed in the vehicle when it is determined that the article has been lost.

19. A lost article management system in a vehicle, comprising:
a first camera or a first sensor that is installed in a vehicle to be separated by a first distance from a seated point of a passenger;
a second camera or a second sensor that is installed in the vehicle to be separated by a second distance from the seated point, wherein the second distance is longer than the first distance;
a plurality of display devices installed in the vehicle; and
an in-vehicle infotainment device installed in the vehicle and using a processor to execute instructions stored in a memory,
wherein the instructions:
generate first detection information by detecting the passenger or the article by using the first camera or the first sensor,
generate second detection information by detecting the passenger or the article by using the second camera or the second sensor,
generate third detection information by detecting a background excluding the passenger and the article, and
determine whether an article has been lost from the first detection information to the third detection information to determine by using a lost status prediction model generated through learning, and
when it is determined that the article has been lost, an instruction that executes an operation of displaying a lost article confirmation request on the plurality of display devices is included;
wherein the generating of the third detection information includes classifying the background into an area in which the passenger is able to put the article down and a prohibited area in which the passenger is not able to put the article down.

20. The lost article management system in the vehicle of claim 19, wherein the instructions:
provide a user interface for a lost article reporting process through the plurality of display devices when it is determined that the article has been lost, and
further include an instruction that executes a lost article report by transmitting a lost article reporting content received through the user interface to a server.

* * * * *